July 4, 1950

L. M. HARRIS, JR 2,513,722

PERIODIC WAVE GENERATOR

Filed May 13, 1948

INVENTOR.
LESLIE M. HARRIS JR.
BY T. L. Bowes
ATTORNEY

UNITED STATES PATENT OFFICE 2,513,722

PERIODIC WAVE GENERATOR

Leslie M. Harris, Jr., Fairport, N. Y., assignor to Stromberg-Carlson Company, a corporation of New York Application May 13, 1948, Serial No. 26,853

4 Claims. (Cl. 250—27)

This invention relates to periodic wave generators and more particularly to sweep frequency generators useful in television receiving sets.

It is an object of my invention to provide a new and improved sweep frequency generator.

In accordance with my invention, there is provided a source of periodically recurring voltage, the period corresponding to the period of the desired output or sweep wave. The periodically recurring voltage may conveniently be developed by periodically charging and discharging a capacitor and applying the potential appearing across the capacitor to the control electrode or grid of a pair of electron discharge devices whose anodes are connected together. Means are provided utilizing the recurring voltage for developing a periodic wave of the same periodicity as the first mentioned voltage but of generally parabolic waveform, as by providing a resistor in the cathode-to-ground connection of one of the discharge devices. Means is then provided for applying a predetermined portion of the parabolic voltage to the grids of the discharge devices in such phase and sense as substantially to improve the linearity of the current wave in the output of the aforementioned discharge devices. A second periodic wave is developed in the second discharge tube utilizing the voltage applied to the control electrodes. The second waveform is added to the output of the first discharge device by reason of the common connection between anodes, the addition further improving the linearity of the output current wave. By properly choosing the output transformer, linearity may be still further improved. As the result of the foregoing steps a substantially linear waveform may be provided in the secondary of an output transformer.

Other objects and advantages of my invention will become apparent as the following description proceeds, and the features of novelty which characterize my invention will be pointed out with particularity in the claims annexed to and forming a part of this specification. For a better understanding of my invention, reference may be had to the accompanying drawing in which Fig. 1 is a circuit diagram illustrating one embodiment of my invention and Fig. 2 is a series of charts depicting typical voltage and current waveforms plotted on a common time axis.

Figure 1:
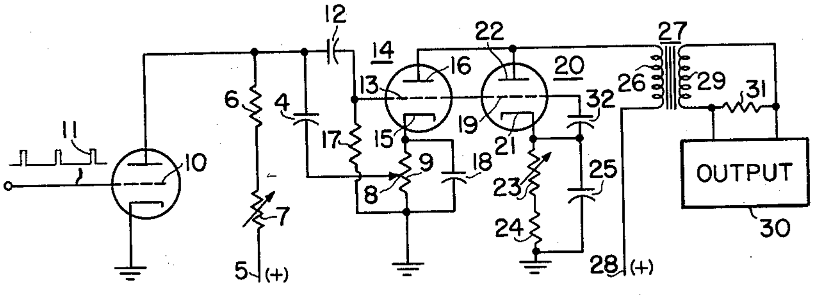
Figure 2:
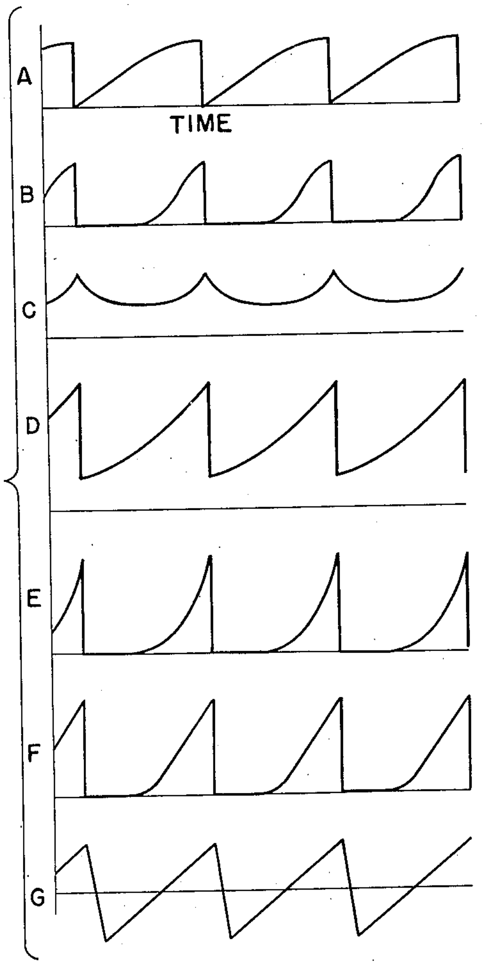

In the embodiment of the invention shown in Fig. 1, a suitable capacitor 4 is connected to a suitable source of direct current potential as indicated by the numeral 5 for charging the capacitor 4 through serially-connected resistors 6 and 7. If preferred, a single resistor of suitable value may be provided. The other side of capacitor 4 is connected to tap 8 of a resistor 9 which may be of the potentiometer type in order to facilitate adjustment of the circuit. The junction of capacitor 4 and resistor 6 is shown connected to a suitable source of synchronizing pulses. The source may constitute an electron discharge device 10 normally biased to cutoff but adapted to be triggered by an external synchronizing source represented by rectangular pulse waveform 11, the pulses recurring periodically in synchronism with the desired output wave. The junction of capacitor 4 and resistor 6 is also connected to the control electrode or grid 13 of a suitable electron discharge device 14 through a coupling capacitor 12. The electron discharge device 14 may be a triode, as shown, or one-half of a double triode, or any other suitable device. The grid circuit of discharge device 14 is completed by grid resistor 17. The cathode circuit comprises the cathode bias resistor 9 which is only partially bypassed by capacitor 18 at the repetition frequency of synchronizing waveform 11.

There is also provided a second electron discharge device 20 which may also be a triode, as illustrated or the other half of a double triode, for example. The control electrode or grid 19 of discharge device 20 is connected to the grid 13 of electron discharge device 14. Both anode 16 of discharge device 14 and anode 22 of discharge device 20 are connected to a suitable source of positive potential, indicated by the reference numeral 28, through an inductive element such as the primary winding 26 of a suitable output transformer 27. Discharge device 20 is preferably biased virtually to cutoff by serially-connected cathode resistors 23 and 24, one or both of which may be adjustable. A single suitable resistor may be substituted if desired. Cathode 21 is preferably completely bypassed to ground at the operating frequency by capacitor 25.

The secondary winding 29 of transformer 27 is adapted to be connected to an output device 30 which, for example, may be magnetic deflection means for a cathode ray tube. If damping means is required, as will be better understood from the further description of my invention, suitable resistance may be provided as indicated generally by the numeral 31. In some cases, if transient oscillations are found circuit operation may be improved by connecting a suitable capacitor 32 between grid 19 and cathode 21.

During the time when discharge device 10 is not conducting, sweep capacitor 4 charges through resistors 6 and 7 and the lower potential end of resistor 9. When a pulse 11 is applied to the control electrode of discharge device 10, the latter conducts and rapidly discharges capacitor 4 through the lower potential end of resistor 9. The alternate charging and discharging produces a periodically recurring voltage waveform across capacitor 4 which is substantially as shown in Fig. 2A.

Inasmuch as capacitor 18 provides a high impedance cathode return for the alternating current components in discharge device 16, the potential of cathode 15 tends to follow the fluctuations of potential on grid 13. The resulting waveform of cathode potential is substantially that shown at C in Fig. 2, but the direct current component of the cathode potential serves to bias discharge device 14 virtually to cutoff. Consequently, the anode current which flows in discharge device 14 has the waveform indicated at Fig. 2B.

Depending upon the setting of tap 8 on resistor 9, a certain proportion of the cathode potential, having the waveform shown in Fig. 2C, is also applied to grid 19 through capacitors 4 and 12 in series, in addition to potential waveform 2A developed across capacitor 4. The sum of these potential waveforms has substantially the waveform shown at Fig. 2D. Since resistors 23 and 24 are selected to bias the anode current of discharge device 20 virtually to cutoff in the quiescent condition, application of waveform D to grid 19 produces the space current waveform in discharge device 20 shown in Fig. 2E.

Anode currents of devices 14 and 20, represented by Figs. 2B and 2E, respectively, are added by the aforementioned connection of anodes 16 and 22 in parallel. By properly adjusting the position of tap 8 on resistor 9 and the values of resistors 23 and 24, the sum of these currents can be made substantially linear as illustrated in Fig. 2F. This adjustment is readily made by observing the current waveform in the anode circuits on the cathode ray oscilloscope and varying tap 8 first toward one end and then the other of resistor 9 and simultaneously varying the value of resistor 23 until the waveform has an optimum degree of linearity.

I have found that transformer 27 may affect the linearity of the current waveform appearing in the output side of transformer 27, a typical waveform being indicated in Fig. 2G. It is believed that the flux existing in the iron of the transformer at the time discharge devices 14 and 20 are cut off cannot be dissipated immediately so that the transformer secondary current reverses from a maximum positive value to a value approximately equal but in the negative direction. There is a tendency to oscillate but by suitable design of the transformer and by the provision of damping means, such as a suitable resistance 31, oscillations are minimized. It is also believed that a very slight amount of current flows through discharge devices 14 and 20 even though the tubes are virtually cut off and additional damping results. Therefore, it is believed that the oscillations are substantially damped and as the transformer flux decays the current builds up as shown in that portion of Fig. 2G below the reference line. As the discharge devices again become conductive the current build-up in transformer secondary 29 continues in the positive direction. By proper choice of inductance, the negative and positive portions of the current wave in the secondary of transformer 27 have substantially the same slope throughout the trace portion of the wave. It is probable that the current build up in transformer 27 follows an exponential but since the slope of the resulting curve varies at a rate approximately opposite to that followed by the combined anode currents, a current wave is produced having a substantially straight characteristic.

A circuit constructed according to the circuit of Fig. 1 comprised the following circuit values:

| | |
|---|---|
| Capacitor 4 | 0.1 $\mu$f. |
| Capacitor 12 | 0.1 $\mu$f. |
| Capacitor 18 | 4 $\mu$f. |
| Capacitor 25 | 20 $\mu$f. |
| Capacitor 32 | 1000 $\mu\mu$f. |
| Resistor 6 | 1 meg. |
| Resistor 7 | 2 meg. |
| Resistor 9 | 500 ohms |
| Resistor 23 | 2000 ohms |
| Resistor 24 | 1500 ohms |
| Transformer 27 | turns ratio 10:1; 60 cycle primary impedance not less than 19,000 ohms. |

While I have shown and described a particular embodiment of my invention, it will be obvious to those skilled in the art that changes and modifications may be made without departing from my invention in its broader aspects. For example, there may be included a variable resistance in the ground connection between resistors 9 and 17 in cases where transients give difficulty. Furthermore, any means for causing discharge of capacitor 4 at predetermined intervals may be utilized. I, therefore, aim in the appended claims to cover all such changes and modifications as may fall within the spirit and scope of my invention.

What I claim is:

1. In a periodic wave generator for developing an output current of sawtooth waveform, a pair of electron discharge paths, each of said paths including an anode, a cathode, and a control electrode, said anodes being connected together and to a source of positive potential, said control electrodes being connected together, one of said discharge devices being biased by a first resistor in series with its cathode, the other of said discharge devices being biased virtually to cutoff in the quiescent state thereof by means of a second resistor in series with its cathode, a capacitor connector between a source of positive potential and a predetermined point on said first resistor thereby providing a charging circuit for said capacitor, means for discharging said capacitor at predetermined intervals, means for applying the combined potential existing across said capacitor and across that portion of said first resistor between ground and said predetermined point to the control electrode of said one path, the values of said resistors determining the linearity of the output waveform appearing at said anodes, and means for partially by-passing said first resistor at the repetition frequency of said predetermined intervals.

2. In a periodic wave generator for developing an output current of sawtooth waveform, a pair of electron discharge paths, each of said paths including an anode, a cathode, and a control electrode, said anodes being connected together and to a source of positive potential, said control electrodes being connected together, one of said cathodes being connected to ground through a first resistance, the other of said cathodes being connected to ground through a second resistance of value to bias the associated electron discharge device virtually to cutoff in the quiescent state thereof, a capacitor, said capacitor being connected between a source of positive potential and a predetermined point on said first resistance thereby providing a charging circuit for said capacitor, means for discharging said capacitor at predetermined intervals, means for applying the combined potential existing across said capacitor and across that portion of said first resistance between ground and said predetermined point to the control electrode of said one path, the values of said resistances determining the linearity of the output waveform appearing at said anodes, an output circuit connected to said discharge paths including an inductive element disposed so that the combined anode currents flow therethrough whereby the linearity of said output waveform is still further improved, and means for partially by-passing said first resistor at the repetition frequency of said predetermined intervals.

3. In a periodic wave generator for providing a substantially linear output current of sawtooth waveform, a pair of electron discharge devices, each of said devices having an anode, a cathode, and a control electrode; said anodes being connected together in an output circuit; said control electrodes being connected together; a resistor in each cathode circuit; a capacitor; means for periodically charging and discharging said capacitor; means for applying the voltage across said capacitor to said control electrodes whereby there is developed in said output circuit periodic pulses of current of frequency corresponding to the desired output current wave, said pulses having a waveform generally corresponding to the voltage across said capacitor; means utilizing said capacitor for applying a predetermined portion of the voltagle appearing across one of said resistors to said control electrodes for modifying the waveform of the potential applied to said control electrodes, thereby modifying the waveform of said output pulses; the other resistor being variable for adjusting the bias of said other discharge device in order to modify further the waveform of said output pulses, the values of said resistors determining the linearity of the output waveform.

4. In a periodic wave generator for developing an output current of sawtooth waveform; a pair of electron discharge devices, each having an anode, a cathode, and a control electrode; said anodes being connected together in an output circuit; said control electrodes being connected together; a resistor in each cathode circuit; a capacitor; means for periodically charging and discharging said capacitor; means for applying the voltage across said capacitor to said control electrodes whereby there is developed in said output circuit periodic pulses of current of repetition frequency corresponding to the desired output current wave and waveform generally corresponding to the voltage across said capacitor, means utilizing said capacitor for applying a predetermined portion of the voltage appearing across one of said resistors to said control electrodes for modifying the waveform of the potential applied to said control electrodes, and a capacitor in shunt with said one of said resistors for partially bypassing said one of said resistors at the repetition frequency of said pulses, the values of said resistors determining the linearity of the output waveform.

LESLIE M. HARRIS, Jr.

REFERENCES CITED

The following references are of record in the file of this patent:

UNITED STATES PATENTS

| Number | Name | Date |
|---|---|---|
| 2,126,243 | Busse et al | Aug. 9, 1938 |
| 2,183,340 | Tolson | Dec. 12, 1939 |
| 2,237,425 | Geiger et al. | April 8, 1941 |
| 2,486,789 | Lakatos | Nov. 1, 1949 |

Certificate of Correction

Patent No. 2,513,722 July 4, 1950

LESLIE M. HARRIS, JR.

It is hereby certified that error appears in the printed specification of the above numbered patent requiring correction as follows:

Column 5, line 41, for "voltagle" read *voltage*;

and that the said Letters Patent should be read as corrected above, so that the same may conform to the record of the case in the Patent Office.

Signed and sealed this 7th day of August, A. D. 1951.

[SEAL]

THOMAS F. MURPHY,
*Assistant Commissioner of Patents.*